Figure 1:
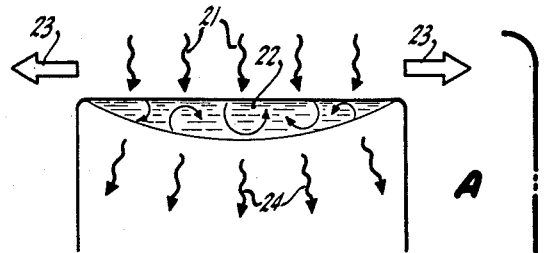
Figure 1:
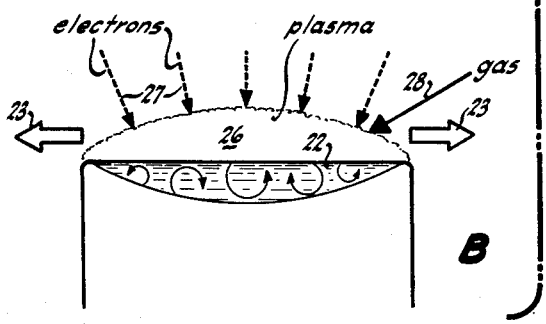

April 2, 1963   H. R. SMITH, JR   3,084,037
GASEOUS ION PURIFICATION PROCESS
Filed Jan. 8, 1960

INVENTOR.
HUGH R. SMITH, JR.
BY
Lippincott & Ralls
ATTORNEYS

United States Patent Office 3,084,037
Patented Apr. 2, 1963

3,084,037
GASEOUS ION PURIFICATION PROCESS
Hugh R. Smith, Jr., Piedmont, Calif., assignor to Temescal Metallurgical Corporation, Richmond, Calif., a corporation of California
Filed Jan. 8, 1960, Ser. No. 1,272
8 Claims. (Cl. 75—10)

The present invention relates generally to an improved and simplified process for the removal of impurities from metals, and more particularly to vacuum processing utilizing reactions between liquid metal and gaseous ions. The present invention is adapted for complete purification of metals and is particularly advantageous in connection with the removal of certain difficult impurities such as oxides from those metals forming extremely stable oxides.

Many metals, and in particular the reactive metals, are known to be extremely difficult to obtain in a pure form. Although there have been developed purification processes for some of the reactive metals, material limitations attach thereto. Thus, for example, the iodide process for producing pure forms of metals such as titanium and zirconium is known to be very expensive, and relatively impractical for the purification of commercial quantities of these metals. It has also been determined that the presence of very small quantities of impurities in the form of compounds of the reactive metals causes a very serious departure of the characteristics of such impure metals from the theoretical properties and characteristics of pure metals. Equally unfortunate is the fact that these departures are normally very undesirable, and, in fact, in the past this has led certain workers in the field to conclude that the metals themselves have these relatively undesirable properties. In many instances, impurities in the quantity of some few parts per million will produce such substantial variations in the physical properties of the metal as to cause same to be wholly unfitted for numerous applications, while in fact the pure metal is ideally suited to such applications.

The present invention is directed to an improved and simplified purification process which is not only capable of removing from metals those impurities which are easily separated therefrom, but is also particularly adapted to the substantially complete removal of other impurities which have hitherto been almost impossible to remove. Broadly stated, the present invention provides for the establishment of desired reactions between gaseous ions and metal-gas compounds, wherein the latter compounds form a part of a liquid metal to be purified. These liquid metal gaseous ion reactions are herein carried out in a very high vacuum by the utilization of an appropriate gas in ionized form, the gas being placed in contact with the surface of the liquid metal to be purified. The reactions produce volatile intermediate compounds with impurities in the metal and continuous evacuation then removes these impurities. Through the choice of suitable gases, it is herein possible to produce compounds which are volatile at the melting temperature of the metal being purified, and which will preferentially form compounds with certain impurities present in the metal so as to thereby free the metal itself from such compounds. With the production of such intermediate compounds of a volatile nature in a high vacuum, it is then possible to immediately and easily remove the impurities from the metal.

More specifically, the present invention is particularly applicable to the removal of oxides from reactive metals such as titanium, for example, and halogen gas is employed to this end. In many instances, reactive metals form oxides which are not readily volatilized, and consequently, heating of the metal even beyond the melting point thereof, will not serve to volatilize the oxides thereof which may be intermixed therewith. Although the oxides of certain metals may be removed by complicated reaction processes, the process hereof provides for removing same through a heating step which is also otherwise advantageous in the processing of such metals. Thus, by the establishment of a low-pressure atmosphere of an appropriate gas in ionized form in contact with the surface of a liquid metal being processed, it is possible to establish and carry out reactions between the gaseous ions and the metal-gas compounds of the liquid metal. These reactions operate to liberate the impurity as a gas or to produce a volatile intermediate compound such as an oxyhalide which is volatile at the temperature of the liquid metal, so as to be immediately exhausted from the reaction region by the continued evacuation of same. Of particular importance is the applicability of the invention to the purification of beryllium with chlorine gas.

It is an object of the present invention to provide an improved and simplified purification process for metals.

Another object of the present invention is to provide a process for establishing reactions of a substantial rate between gaseous ions and metal-gas compounds forming impurities in a liquid metal to thereby free the metal from such compounds.

A further object of the present invention is to provide a process for purifying liquid metal by establishing reactions between gaseous ions and metal oxides at high temperatures to form volatile compounds in a high vacuum, whereby the volatile compounds are removed to leave a purified metal.

Yet another object of the present invention is to provide an improved process for purifying metal by establishing reactions between low-pressure ionized halogen gas and metal-gas compounds comprising impurities in the metal, to form volatile intermediate compounds and gases that are removed by evacuation.

A still further object of the present invention is to provide an improved process for purifying beryllium to remove oxides therefrom by establishing reactions in a vacuum between ionized gaseous chlorine and liquefied beryllium containing oxides thereof, whereby oxygen is freed and removed by evacuation.

Various other objects and possible advantages of the present invention will be apparent to those skilled in the art from the following disclosure and illustrative examples; however, no limitation is intended thereby, and reference is instead made to the appended claims for a precise delineation of the true scope of the present invention.

Figure 2:
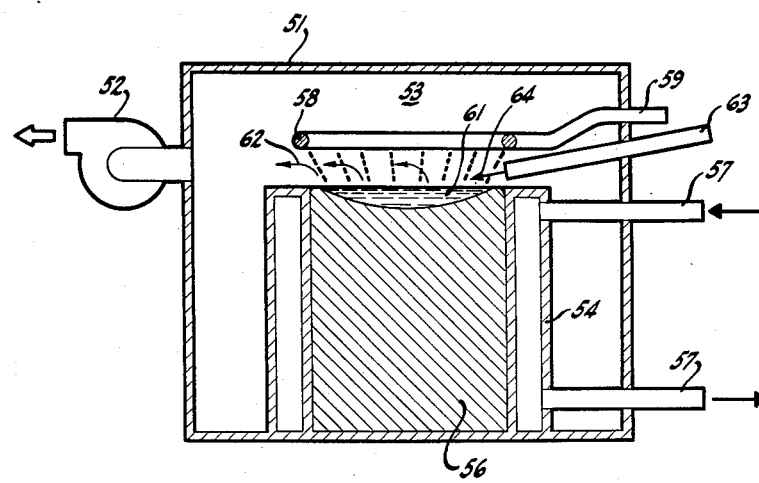

The invention is illustrated in part in the accompanying drawing, wherein:

FIG. 1 illustrates at separate portions thereof certain steps of the present invention; and FIG. 2 is a schematic illustration of apparatus that may be employed to carry out the present invention.

Considering first the general method of the present invention, there are established conditions conducive to rapid reactions between the selected gas and the metal to be purified. The metal is heated to melt same and the pressure above the liquid metal is reduced to about one micron of mercury or less. A plasma is established immediately above the liquid metal with the selected gas in ionized form forming a part thereof. The intense reactivity of the ionized gas in the presence of high-temperature molten metal provides highly advantageous conditions for desired reactions to proceed at a substantial rate.

For the purification reactions there is chosen a gas with which the metal preferentially reacts, so as to free the metal from metal-gas compounds existing in the metal to be purified. The chosen gas is one that does not remain in the metal, but serves only to replace the impurity in the metal. Also the gas liberates the impurity as a gas or as a volatile intermediate compound at the temperature of the molten metal. Continued stirring of the molten metal serves to provide for contact between the ionized gas and all of the molten metal. Such stirring is preferably accomplished by establishing substantial thermal gradients in the liquid metal.

The process hereof is particularly advantageous in removing oxygen from metals which form oxides of a high boiling point. For such processes the halogens are preferred, as the metals preferentially react therewith to free the oxygen from the oxide bonds. There may be produced in this manner oxygen gas or volatile oxyhalides which are then rapidly removed by evacuation to leave a pure metal.

As above noted the present invention is particularly advantageous for purifying beryllium to remove oxides therefrom. As applied to beryllium, the process hereof comprises the steps of first liquefying the beryllium metal to be purified. The charge material for the process hereof may be, to a certain extent, purified to remove certain gross impurities that may normally be present therewith, such as, for example, other metals or the like. Remaining from conventional purification methods, there is found to be various metal-gas compounds intermixed with the beryllium metal. Thus, for example, there will normally be present in beryllium metal certain nitrides, hydrides, and oxides of beryllium. In accordance herewith, the metal including these impurities of metal-gas compounds is heated to raise the temperature thereof above 1280° C., the melting point of the metal. This illustrated in in FIG. 1A wherein the arrows 21 are provided to indicate the application of heat to the upper surface of a pool 22 of beryllium metal. The liquefication of the metal to be purified is carried out in a high vacuum and evacuation of the reaction region is indicated in FIG. 1A by the block arrows 23. Impurities are removed by volatilization and evacuation. In order for the impurities to be readily and rapidly removed, the reaction region or volume is maintained at a low pressure, not in excess of one micron of mercury. Evacuation of the reaction area is continued throughout the process hereof in order that volatile impurities shall be immediately removed, and shall not remain long enough to re-dissolve or re-combine with the metal being purified. Inasmuch as a reaction is to be herein carried out between a gas and a liquid, it is of substantial advantage to agitate or stir the liquid so as to circulate the same and to thereby expose all of the liquid to the gaseous atmosphere with which same is to react. This stirring action is herein accomplished by the removal of heat from the bottom of the pool of liquid metal. Such is illustrated at FIG. 1A by the arrows 24 radiating outwardly from the bottom of the pool 22 and this removal of heat may be readily accomplished by cooling the under side of the pool. By the addition of heat to the top of the pool, and removal of heat from the bottom thereof, there are established thermal gradients within the pool which cause a substantial stirring action, so that all of the liquid moves about within the pool to come in contact with or closely approach the upper surface of the pool.

The desired reaction is herein accomplished by the establishment of a plasma above the pool of liquid metal. This is illustrated in FIG. 1B, wherein the plasma 26 is generally indicated by the light line defining a limited volume above the pool. Such a plasma may be readily formed by bombardment of the upper surface of the pool with ions or electrons, as indicated by the dotted lines 27, and by the introduction of a gas into the region above the pool, as indicated by the arrow 28. The gas 28 will be ionized by the charged particles directed onto the pool, and will, in combination with same, form an electrically neutral plasma above the pool surface.

Considering the purification process hereof in the light of the above description, it will be seen that the metal to be purified is first liquefied, as, for example, by bombardment by electrons or ions. Immediately above the liquid pool of metal there is introduced a particular gas at a low pressure. The region above the liquid pool is continuously evacuated, so that there is established thereat an atmosphere of the desired gas at a pressure not in excess of one micron of mercury. The gas is ionized by suitable means, such as, for example, the bombarding electrons or ions and this ionized gas is then available to react with compounds of the metal to be purified, so as to reduce the metal by the formation of other compounds. The impurities freed by the reaction are volatile at the temperature of the liquid metal, so as to rise from the pool thereof and to be immediately removed from the reaction area by the continued evacuation thereof.

Considering further the specific example of the process hereof, heat is applied by electron bombardment of the metal to raise the temperature of the beryllium above 1280° C. At this temperature, beryllium nitrides and hydrides are volatilized, inasmuch as the boiling points of such compounds are less than the melting point of the metal itself. Regarding oxides of beryllium, same will remain as a liquid within the metal, for the boiling point of beryllium oxide is substantially greater than the melting point of beryllium metal. By the addition of a halogen gas 28, in this instance chlorine, there are provided gaseous chlorine ions immediately above and in contact with the surface of the liquid metal pool. These gaseous ions of chlorine will react with the beryllium metal and with beryllium oxide. Insofar as the metal-gas reaction is concerned, same may be written as $$Be + 2Cl^- \rightleftarrows BeCl_2$$

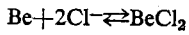

and it is also possible that the reaction $Be + 3Cl^- \rightleftarrows BeCl_3$ will occur. As will be appreciated from the reaction notations above, same proceeds in both directions, and the reverse direction of the reaction is sufficiently rapid that only small amounts of the beryllium chloride actually exists in the molten metal at equilibrium. The chlorine ions also react with beryllium oxide as follows: $2BeO + 4Cl^- \rightleftarrows 2BeCl_2 + O_2$. Although this latter reaction is also reversible, the reverse reaction is relatively small. By the introduction of chlorine ions into intimate contact with the liquid metal containing oxides thereof, there are thus produced reactions wherein the beryllium oxide is changed into beryllium chloride with the evolution of oxygen in a gaseous form. The beryllium chloride tends to disassociate into the pure beryllium metal and chlorine ions, so that the result is a relatively pure metal with oxygen escaping therefrom.

In addition to the above-noted possible reactions by the utilization of chlorine ions in contact with liquid beryllium metal containing oxides therein, there may also be formed intermediate compounds of oxychlorides which also have a sufficiently low boiling point that they are immediately vaporized at the temperature of the liquid metal so as to rise from the surface of the liquid pool and to likewise be immediately evacuated from the region. Both of the above possibilities, the liberation of oxygen as a gas, and the volatilization of oxychlorides from the metal, will be seen to operate to reduce the beryllium to a pure state with the evolution of the gas or vapor from the metal and an immediate removal of same by the continued evacuation of the reaction region above the metal.

The continued stirring of the liquid metal pool serves to provide for a highly desirable and intimate contact between the metal and metal-gas compounds therein with the gaseous ions provided immediately above the pool. It has been determined that reactions occur not only upon the surface of the pool, but also somewhat below the surface. Free chlorine ions impinging upon the liquid metal pool will, to a limited extent, be drawn into the pool so that reactions may occur below the actual surface of the pool. The evolution of gases and vapors within the pool by reaction of the chlorine ions with the metal gas compounds in the pool, serves to release the impurity from the metal and this is further enhanced by the stirring action wherein such vapors and gases may readily escape from the upper surface of the pool by the continued agitation thereof.

Although the present invention has been described above in connection with particular metal and a particular gas employed as a reducing agent therefor, it will be apparent that certain variations and modifications are possible with regard to the material that may be employed in the reaction. Thus, in accordance with the present invention, it is possible to employ halogen gas ions, and chlorine ions are particularly applicable in the case of beryllium. It is also possible to purify metals other than beryllium, in accordance with the present invention, and furthermore, to remove impurities other than oxygen from the metal. The present invention contemplates the establishment of a reaction between a metal and a gas with which the metal preferentially reacts, as compared to the elements or complexes forming impurities in the metal. Considered otherwise, in the above example beryllium has a much greater affinity for chlorine than for oxygen, and by the provision of chlorine as an ion in gaseous form in direct contact with beryllium oxide in liquid form, it is then possible to carry out replacement reactions wherein the beryllium is reduced to pure form, and the oxygen is liberated either as a gas or as an intermediate compound which vaporizes at the temperature of the reaction. In any instance, the intermediate compound formed, or the element liberated by the reaction between the gaseous ions and the material of the pool, must have a vaporization temperature which is lower than the melting point of the metal or at least have a substantial vapor pressure at this temperature. This requirement is imposed to the end that the impurity released will, in fact, be removed from the metal pool. The ionized gas herein provided to carry out desired reactions for the purification of metal is a very powerful reactant, and it has been established that reactions of the type set forth above, as exemplary of the present invention, proceed at a very substantial rate so that oxides, for example, are removed from liquid metal to such an extent that no measurable quantity thereof remains. It is possible, in accordance with the present invention to purify beryllium, for example, to such an extent that the oxygen content falls far below some few parts per million.

Particular attention is invited to the importance of removing even vestigial traces of certain impurities such as oxygen from particular metals. Many metals are found to be very seriously affected, insofar as the properties thereof are concerned, by the presence of minute quantities of impurities such as oxygen, therein. It has been determined that certain impurities, such as oxygen, congregate at the grain boundaries of the metal, and consequently provide points of attack which thereby materially reduce, if not destroy, certain desired properties of the metal. The refractory properties of titanium and zirconium, for example, are seriously affected by minute quantities of oxygen. It is only by the removal of these trace impurities that it is possible to realize the theoretical properties of certain metals. In this respect beryllium is an outstanding example, for although this metal has received only limited attention in industry, it is well known that the theoretical properties thereof make the metal ideally suited for numerous applications. This theoretical knowledge has proven to be of small use in the past, because of the extreme difficulty of obtaining truly pure beryllium. By the present invention it is possible to quite rapidly and inexpensively purify beryllium, while at the same time casting same into ingots, or the like. The process of this invention is adapted to produce substantial quantities of pure metal, which cannot be prepared in commercial quantities by any other known method.

Although the purification method of the present invention is applicable to a wide variety of metals, which are presently unavailable in commercial quantities, particular importance attaches to the use of the present invention with the elements boron, beryllium, and thorium, for example. In each of these instances, the oxides of the metal have a very high boiling point, and consequently, purification of the metal by heating does not serve to remove the oxides therefrom. Although the present invention is quite simply carried out by the application of heat through the utilization of heating means such as, for example, electron or ion bombardment of metals, it is furthermore possible, in accordance herewith, to very simply add to the heating step of the present invention a chosen gas which is provided in ionized form to react with the metal-gas compound, and in particular, with the metal oxides, to thereby release the metal oxide bonds. By the carrying out of this reaction between gaseous ions and liquid metal, it is possible then to reduce the metal so that oxygen is liberated therefrom either as a gas or as a volatile intermediate compound, which is immediately and readily removed by the continued evacuation of the region surrounding the reaction.

While it will be apparent that a wide variety of apparatus may be employed to carry out the purification process of the present invention, particularly apparatus lends itself quite well to this purpose. There is illustrated as an example of apparatus that may be employed herein, an electron beam furnace in FIG. 2 of the drawings. Referring thereto, there will be seen to be provided an enclosure 51 to which there is connected evacuation means illustrated as a pump 52. This pumping means 52 is adapted to maintain a low pressure within a chamber 53 defined by the enclosure 51, and this pressure is herein maintained at a maximum of one micron of mercury. A very substantial pumping speed is required for purification reactions wherein substantial amounts of material are employed, in order that gases and vapors evolved during the reaction may be very rapidly removed so as to preclude pressure excursions within the chamber. Within the evacuated chamber 53, there is provided a mold 54, formed for example of copper, and adapted to contain a cast ingot 56. The mold 54 is adapted to be cooled as by the passage of a cooling fluid through passages therein and pipes 57 may extend from the mold to an external source of cooling fluid for removing heat from the metal ingot 56. Provision is made for heating the upper surface of the metal ingot 56, and in this respect there is illustrated a thermionic cathode 58 disposed above the mold 54, and adapted for energization as by means of electrical leads 59 extending exteriorly of the enclosure 51 and connected, for example, to suitable power supply means for passing a current through the cathode.

By the application of a relatively negative potential to the cathode 58 with respect to the mold or metal therein, it is possible to emit electrons thermionically or otherwise from the cathode, and to direct same downwardly into the mold. Suitable focusing means also may be employed in connection with the direction of electrons into the upper surface of the mold; however, inasmuch as same forms no part of the present invention, no particular illustration thereof is included. By the establishment of an electron discharge into the top of the mold onto the upper surface of the metal ingot 56 therein, this metal will thereby be heated. Heat imparted to the metal by the bombarding electrons will serve to melt the metal and thereby form a liquid pool 61 atop the ingot 56, with heat being applied to the top of such pool and heat being removed from the bottom thereof. In this manner then, there is provided for melting of the metal to form the liquid pool, and also there is provided the stirring action which results from the thermal gradients established in the pool.

As noted in the above description of the method of the present invention, heating of the metal to liquefy same raises the temperature of the metal above the boiling point of various compounds thereof. Thus, for example, nitrides and hydrides of beryllium are vaporized at the melting temperature of the metal, and, consequently, boil off of the liquid pool of metal and are immediately evacuated from the chamber 53. This operation is indicated by the small arows 62, directed from the top of the pool toward the evacuation means 52. In accordance with the present invention, there is provided a pipe or the like 63, extending toward the top of the mold 54 and through the enclosure 51. This pipe 63 is adapted to provide a slow leak of gas into the region immediately above the pool 61. A suitable gas source may be attached to the pipe 63 exteriorly of the enclosure 51, so as to meter a small amount of gas through the tube into the chamber 53. This gas, indicated by the arrows 64, escaping into the chamber 53 immediately above the pool 61, will then be ionized by the bombarding electrons from the electron source 58. There will consequently be formed a plasma of gas ions and electrons immediately above the pool, and the ionized gas therein will react with the metal of the pool and with compounds of the metal. In particular, oxides in liquid form in the pool will react with the gaseous ions at and immediately below the pool surface, to thereby reduce the metal and to liberate the oxygen either in the form of oxygen gas or in the form of volatile intermediate compounds, such as oxyhalides. In either of the above instances, the product of the reaction is in a gaseous form at the temperatures of the pool, so as to thereby rise from the pool and be immediately evacuated by the pumping means 52.

What is claimed is:

1. A method of purifying metal of oxides thereof which have a high boiling point, and comprising the steps of applying heat to the metal to melt same, stirring the molten metal to circulate same across the exposed liquid surface thereof, supplying ionized halogen gas to the surface of the molten metal whereby same reacts with the metal oxides to sever the bonds thereof and free the metal while releasing the oxygen in volatile form, and maintaining a vacuum of at least one micron of mercury above the molten metal whereby volatilized impurities are removed from the region of the metal.

2. A method of purifying metal as set forth in claim 1, further defined by bombarding an upper surface of the metal with charged particles to heat and melt same, cooling the under surface of the metal to establish thermal gradients therein for stirring the molten metal, and directing the halogen gas into the bombarding particles for ionizing the gas.

3. A purification method as set forth in claim 1, further defined by said metal comprising beryllium and said halogen gas comprising chlorine.

4. An improved purification process for metals having therein oxides of high boiling temperature, comprising the steps of heating the metal within an evacuated chamber to a temperature above the melting point thereof to form a liquid metal pool, continuously evacuating the chamber to maintain a vacuum above said pool, directing a halogen gas into a region immediately above said pool, forming a plasma including halogen gas ions above said pool in contact with the surface thereof for reacting with metal-oxides therein to release the oxygen from the metal-oxide, said released oxygen rising from said pool and being rapidly removed by the evacuation of said chamber, and said halogen gas being chosen to have a dissociation temperature from said metal which is less than the temperature of said liquid metal pool to likewise depart from the pool to leave a purified metal.

5. An improved process of casting metal and simultaneously purifying same of metal-gas compounds, comprising the steps of heating the upper surface of a metal to a temperature above the melting point thereof for liquefying same, cooling the lower metal portion of the metal to form a liquid metal pool atop the metal to establish thermal gradients in the molten metal for stirring same whereby gas compounds of the metal having a boiling point below the temperature of the molten metal are volatilized to rise from the metal, continuously evacuating a region immediately above said pool for removing said volatile impurities, supplying a low pressure ionized gas above said pool in contact with the upper surface thereof, said gas having a greater affinity for said metal than does the gas of remaining metal-gas compounds, to thereby displace the gas of said compounds whereby the latter volatilizes from said metal, and maintaining the temperature of said metal sufficient to also volatilize said ionized gas therefrom so that all gas is volatilized from the pool to rise therefrom and be carried away by said evacuation.

6. A process of purifying a metal chosen from the group consisting of titanium, zirconium and thorium to remove oxides therefrom, comprising the steps of heating the metal to melt same and form a liquid pool thereof, stirring the liquid pool of metal, contacting the pool with ionized halogen gas at a low pressure whereby such gaseous ions react with the metal oxide to free the metal and liberate the oxygen, and continuously evacuating a region above the liquid pool to a pressure of the order of one micron of mercury to immediately remove gases and vapors evolved from the pool whereby the metal is purified of oxides.

7. A process of removing metal-gas compounds of beryllium from beryllium metal for purifying the metal, and comprising the steps of melting the metal by the application of heat thereto for vaporizing metal-gas compounds that are volatile at the melting point of the metal, continuously evacuating a region encompassing the molten liquid to rapidly remove vapors and gases evolved therefrom, and establishing a plasma contacting the molten metal and containing ionized chlorine whereby the latter reacts with beryllium oxide to liberate the oxygen, said liberated oxygen and chlorine being removed by said evacuation to leave purified beryllium.

8. An improved method of purifying metal to remove therefrom gaseous impurities chemically bound to the metal and comprising the steps of heating the metal to form a molten pool of metal, continuously evacuating a region about the molten pool to maintain a very low pressure atop said pool, ionizing a reactant and forming a plasma thereof in contact with the upper surface of said molten pool, said reactant comprising an element which preferentially reacts with said metal at the temperature thereof to displace said gaseous impurity and also being volatilizable from said molten pool after reaction, whereby said continuous evacuation removes both impurities and reactant volatilizing from the pool to thereby leave purified metal in the pool.

References Cited in the file of this patent

UNITED STATES PATENTS

| | | |
|---|---|---|
| 2,617,761 | Sheer et al. | Nov. 11, 1952 |
| 2,820,722 | Fletcher | Jan. 21, 1958 |
| 2,828,199 | Findlay | Mar. 25, 1958 |
| 2,899,294 | Siemons | Aug. 11, 1959 |
| 2,921,892 | Casey | Jan. 19, 1960 |

OTHER REFERENCES

Di Pietro and Findlay: Metallurgical Abstracts, vol. 21, 1954, p. 801. The article is called Preparation of Ductile Zirconium.